US009743253B2

(12) United States Patent
Heikkila et al.

(10) Patent No.: US 9,743,253 B2
(45) Date of Patent: Aug. 22, 2017

(54) METHOD AND ARRANGEMENT FOR LOCATING A MOBILE DEVICE

(71) Applicant: GLOPOS FZC, Dubai (AE)

(72) Inventors: Timo Heikkila, Hyvinkaa (FI); Mikael Vainio, Dubai (AE)

(73) Assignee: GLOPOS FZC, Dubai (AE)

( * ) Notice: Subject to any disclaimer, the term of this patent is extended or adjusted under 35 U.S.C. 154(b) by 0 days.

(21) Appl. No.: 14/837,330

(22) Filed: Aug. 27, 2015

(65) Prior Publication Data
US 2017/0064515 A1 Mar. 2, 2017

(51) Int. Cl.
*H04W 4/04* (2009.01)
*H04W 4/02* (2009.01)

(52) U.S. Cl.
CPC ........... *H04W 4/043* (2013.01); *H04W 4/026* (2013.01); *H04W 4/027* (2013.01)

(58) Field of Classification Search
None
See application file for complete search history.

(56) References Cited

U.S. PATENT DOCUMENTS

| 2009/0112517 | A1* | 4/2009 | Hsyu ................... G01S 5/021 702/181 |
| 2013/0079039 | A1 | 3/2013 | Heikkilae et al. |
| 2013/0095849 | A1 | 4/2013 | Pakzad |
| 2013/0102283 | A1* | 4/2013 | Lau ...................... H04W 12/06 455/411 |
| 2013/0102334 | A1* | 4/2013 | Khorashadi ......... G01C 21/206 455/457 |
| 2013/0225196 | A1* | 8/2013 | James ................... H04W 4/028 455/456.1 |
| 2015/0119086 | A1 | 4/2015 | Mirowski et al. |

FOREIGN PATENT DOCUMENTS

| GB | 2352134 | 1/2001 |
| WO | 2010/055192 | 5/2010 |
| WO | 2014153727 | 10/2014 |

OTHER PUBLICATIONS

International Search Report PCT/IB2016/055064 dated Oct. 14, 2016.

* cited by examiner

*Primary Examiner* — Daniel Lai
(74) *Attorney, Agent, or Firm* — Young & Thompson

(57) ABSTRACT

A method for locating an electronic mobile device capable of wireless communication, the method including obtaining a probability map structure for the area of interest, the probability map structure associating environment data values, preferably including cellular network based data, with location data, obtaining a number of probabilistic temporospatial motion models for different types of motion, the models at least partly defining transition probabilities between location estimates relative to time, obtaining at least environment data captured or determined by the mobile device at a plurality of sequential time instances, and determining the most probable location estimate of the mobile device based on combining probability data from both the probability map structure and the motion models, wherein the at least environment data is best fitted in the motion models and probability map structure according to predefined criteria. Related two arrangements and a computer program are presented.

32 Claims, 7 Drawing Sheets

METHOD AND ARRANGEMENT FOR LOCATING A MOBILE DEVICE

TECHNICAL FIELD OF THE INVENTION

This invention relates generally to locating mobile devices comprising mobile positioning or positioning-enabling technology. More particularly the invention relates to solutions for determining a location of a mobile device in which the locating is based on captured or determined environment data.

BACKGROUND OF THE INVENTION

The need for locating a mobile device or its user may come from the user desiring to know one's own location or from an authority for which the information about the location of a person has become important for some reason, e.g., in a case of emergency.

Location tracking devices and other such mobile terminals, e.g. smartphones or other hand-held or wearable apparatuses, may comprise cellular communication functionality such as a transceiver for collecting cellular data from nearby cells/base stations, e.g. indications of signal strength, and reporting it to a receiver at the remote location, and most typically, a satellite-based location determination functionality, e.g. a receiver and related positioning logic for global positioning system (GPS) or GLONASS (Global Navigation Satellite System) satellite positioning signals.

To determine a location based on utilizing a satellite signal such as the GPS signal, a GPS receiver must have current almanac data and ephemeris data from at least three appropriate satellites and an initial estimate of its location. However, the associated signal coverage easily suffers from interruptions caused by landscape obstructions such as geographic features, buildings or related urban canyon, trees, etc. Because mobile devices are often operated in positioning-wise challenging environments, such as cities and urban areas, wherein GPS or generally satellite navigation signal reception will be intermittent, this can result in poor performance of the location tracking system based thereon.

There are some supplementary technologies developed to tackle the weaknesses of GPS-based existing location determination technology at location tracking devices such as GPS-equipped mobile terminals. One proposed method is assisted GPS (AGPS) to update the almanac and/or ephemeris data in order to improve performance of the associated devices. AGPS systems exploit remote terrestrial stations in locations in which good reception of satellite signals is expected and assistance data established based on signals received thereat are then transmitted e.g. via a cellular communication network to the mobile terminals.

The start-up of a GPS-receiver typically requires the initial estimate of its location and this process takes several minutes. In order to speed up the start-up of the GPS-receiver, the remote/mobile terrestrial stations can produce assistance data based on identifiers of cellular network base stations and time delay data received from the cellular network base stations, and this data is used to improve the initial location estimate.

The location estimation procedure described above takes into account assistance data that includes ephemeris data received from satellites and identifier and time delay data from the cellular base stations. Despite of its obvious benefits in certain use scenarios, it may also easily result in inaccurate location estimate because certain environment obstructions and their influences are ignored during the process. The location estimation described above is based on performing an analysis of the location of the mobile terminal with respect to the locations of the base stations and therefore if the exact base station locations are not available the resulting location estimates become distorted. The location estimation procedures described above do not estimate for each cell a location of a base station or a coverage area of the base station (area reached by the radio signal). Yet, the location estimation procedures described above don't make any estimation of a type of the cell with regard to landscape and cityscape, etc.

WO 2010/055192 discloses a method and system for positioning with enhanced accuracy. The suggested solution yields excellent results based on first collecting, from a number of terminals devices, positioning data such as GPS data and environment data including e.g. cell data during a modelling phase to determine covered area estimates of cell network base stations, whereupon during a locating phase the mere environment data suffices for accurate positioning due to the available covered area estimates with various supplementary data.

In US 2013/0079039, the solution of '192 is developed further by adding vertical information to the position estimates to obtain true 3D (three dimensional) positioning.

Notwithstanding the numerous improvements the '192 and '039 clearly introduce to the prior art, the associated solutions may still be optimized having regard to a number of factors and different possible use scenarios.

Yet, as the information available about the environment of an object, such as a mobile phone, to be tracked becomes all the time more versatile due to the emerge of new communications technologies such as 4G/LTE (Fourth Generation/Long-Term Evolution) or 5G (Fifth Generation mobile networks), also new possibilities may arise to extend the data input space. By concentrating the locating efforts around any certain, single type of data source or a related model may not give optimum results during real-time positioning, when a variety of data sources in terms of different network signals, etc. are available and detectable by the object to be positioned.

Further, many of the contemporary positioning solutions work lousily in situations where data input space used for locating a target device is at least momentarily and e.g. abruptly reduced or severely distorted, whereupon a position estimates solely based on the latest data input is easily very erroneous. These solutions greatly omit the potentially massive data history collected earlier and information derivable therefrom to maintaining the positioning accuracy also in changing conditions with poor signal reception.

Based on the above-mentioned, it is clear that the locating of mobile devices can still further be developed. Especially techniques which do not require satellite positioning or prior knowledge of the locations of base stations or wireless network access points are needed.

SUMMARY OF THE INVENTION

It is an objective of the invention to provide a method, computer program and arrangements for determining the location of a mobile device in connection with cellular network and configured to capture or determine at least environment data.

The invention is characterized by what is presented in the independent claims. Embodiments of the invention are presented in dependent claims.

According to a first aspect, a method for locating an electronic mobile device capable of wireless communication comprises
obtaining a probability map structure for the area of interest, said probability map structure associating environment data values, preferably including cellular network based data, with location data, preferably including satellite positioning based data,
obtaining a number of probabilistic temporospatial motion models for different types of motion, said models at least partly defining transition probabilities between location estimates relative to time,
obtaining at least environment data captured or determined by the mobile device at a plurality of sequential time instances, and
determining the most probable location estimate of the mobile device based on combining probability data from both the probability map structure and said motion models, wherein the at least environment data is best fitted in the motion models and probability map structure according to predefined criteria.

According to a second aspect, an arrangement for locating a mobile device operable in a wireless network comprises
a data repository comprising a probability map structure for the area of interest, said probability map structure associating environment data values, preferably including cellular network based data, with location data, and further comprising a number of probabilistic temporospatial motion models for multiple different types of motion, said models at least partly defining transition probabilities between location estimates relative to time,
a communication interface for obtaining at least environment data perceived at the mobile device at a plurality of sequential time instances, and
a positioning entity configured to determine the most probable location estimate of the mobile device based on combining probability data from both the probability map structure and said motion models, wherein the at least environment data is best fitted in the motion models and probability map structure according to predefined criteria.

In an embodiment, a motion model comprises a plurality of elements determining motion characteristics and preferably, related probabilities, for the desired motion type. Also practically zero probability characteristics, i.e. absolute limits or e.g. value ranges excluded from the applicable range of possible motion having regard to that particular model, may be included therein.

The motion model at least partly defines, by the associated elements such as model parameters and related values, transition probabilities between location estimates, or location data points, relative to time, i.e. motion or 'movement' probabilities taking also temporal factors and data into account in addition to mere location data or environment data used for determining the location. A skilled person shall, however, understand that also other models or parameters besides the ones of the motion models may affect the probabilities depending on the embodiment.

The motion model may include one or more elements indicative of at least one motion characteristic selected from the group consisting of: speed, velocity, speed fluctuation, velocity fluctuation, acceleration, deceleration, turn rate, turn frequency, linearity of motion, stop, stop duration, stop frequency, direction change, direction change frequency, and direction reversal.

The motion model may define for each element, or 'parameter', different (numerical) values and/or value ranges, which may include probabilities characteristic to the particular model. Thus, the model can characterize typical and atypical motion for the concerned type.

The type, or class, of motion described by a motion model may generally indicate e.g. walking, crawling, immobility, cycling, running, motor vehicle travel (as a passenger or driver) such as travel on a car, train, bus, moped, motorcycle, etc. For example, with a certain model such as a car model, certain higher speed values (e.g. over 30 km/h) are associated with a higher probability than lower speeds in contrast to e.g. some other model like a walking model, where the probabilities may be substantially opposite. Likewise, probability of complete, substantially sudden reversal of propagation direction may be substantially higher with one model such as a walking model than with another model such as a (motor) vehicle model.

In another, either supplementary or alternative, embodiment a motion model is associated with a predefined area or area type. The area may refer to a single location (unit or point) depending on the used location resolution or a larger area encompassing a plurality of locations.

For example, urban, indoor or pedestrian center/street area or area type may be associated with a motion model different from the model associated with a highway, countryside or a forested area, as the motion characteristics within such diverse areas will likely differ as well, which is indicated by the parameter value probabilities such as the aforesaid speed (in urban areas, lower speeds being more likely than higher speeds, and vice versa in rural areas).

A certain area or area type may be associated with a plurality of motion models, when applicable. For example, there may be a pavement next to a road, etc. substantially in the same (greater) area, whereupon e.g. walking and vehicle-based motion models are initially possible, if not equally likely. Yet, an area may be assigned with a certain area type, or 'class', which has been, in turn, associated with a number of motion models considered appropriate for the type. Therefore, specific areas may be linked with motion models via area types.

In some embodiments, data from multiple motion models may be combined or a combinatory model be established by utilizing e.g. certain general motion model, e.g. a motor vehicle model, and area related motion model such as urban/city model, which may involve adopting characteristics such as parameter value ranges from all source models with 'AND'-type logic, for instance.

Generally, in various embodiments of the present invention, a number of at least initial motion models may have been established beforehand, i.e. prior to positioning, during a so-called modeling or mapping phase. Data may have been gathered from a plurality of mobile devices to establish the motion models. Likewise, different data sources such as various environment data sources (sensors, wireless networks) and the positioning data (e.g. satellite and/or terrestrial positioning signals) may have been used to determine model characteristics such as speed values/ranges and related probabilities.

Alternatively or additionally, one or more motion models may have been established or selected for different areas or area types based on known area characteristics, optionally map data or street plan, indicative of area features such as roads, pavements, parks, walking areas, water areas, buildings, fields, forests, etc. Automated logic may be established to derive model parameters from the available digital area characteristics data.

In various embodiments, the motion models may be dynamically established or at least updated later e.g. based on the data becoming available, such as new environment data and optionally positioning data, obtained during the actual positioning activity.

Preferably, during positioning, the obtained, preferably substantially current, environment and optionally explicit positioning data (e.g. GPS data) having regard to a target mobile device is utilized to determine the most probable current location, i.e. location estimate, based on the probability map structure mapping the environment data with location data.

The environment data having regard to the mobile device in question is also fitted in the motion models, which may refer to updating the probabilities of current location candidates by a weighting action that takes into account previous location estimates, and preferably related probabilities, and also the characteristics of the particular motion model in terms of e.g. speed/turn rate figures and related probabilities in the model. Thus, the potential transitions between location candidates indicated by at least environmental data indicating e.g. certain speed, turn rate, or other motion characteristics described by a model are matched against the model and location candidates better fitting the model are weighted in terms of probability over the remaining candidates.

In case several motion models are utilized in parallel, the most probable one in the light of the environmental data and optionally positioning data may be ultimately selected for defining the final location probabilities to the target mobile device. Several models originally applicable (allocated as possible to the concerned area, for example) may, upon each positioning action or location update, be compared with the recent (current/latest and preferably at least some previous) environment and optionally positioning data, and a best fitting combination (model vs. data) be used to determine the most appropriate model for updating the probabilities of different locations from which the most likely one, i.e. the location with highest overall probability, is ultimately picked as the most probable location estimate.

In some embodiments, predefined route data such as route model data is utilized for adapting the probabilities of location estimates during positioning. Route data may be associated with a certain area. Route data may describe the probabilities of different sequential location transitions within the area, i.e. routes.

Alternatively or additionally, the route data may generally determine areas of lower likelihood and higher likelihood for presence of mobile devices within a greater area, i.e. so-called cold spots or hot spots, respectively.

For example, in a rocky area accommodating a hiking trail, people's presence on the trail is very likely in contrast to e.g. surrounding cliffs or rocks. Thus, the location candidates hitting the trail during the positioning phase may be given additional weight (increase in probability) over the remaining locations. If, however, a user/device leaves the hiking trail to move on cliffs or rocks, and once the data measured to verify and support this type of movement is vast enough, the probability of the movement on the cliffs or rocks becomes higher for the user/device in question. When or if this particular data is then utilized in mapping (i.e. to update the probability map), the movement on the cliffs or rocks becomes a bit higher in general but it is still improbable compared to the movement on the hiking trail for which a high number of devices have previously been located.

Also route data may be established from data gathered during mapping and/or positioning phases from a plurality of mobile devices. Route data may be further established based on known area characteristics, optionally (digital) map data or (digital) street plan, indicative of area features such as roads, pavements, parks, walking areas, water areas, buildings, fields, forests, etc. As with motion models, automated logic may be established to derive route data or route model data from digital area characteristics data.

In some embodiments, the environmental data may incorporate, besides cellular or generally wireless network based data, sensor data that is captured at the mobile device(s) by optionally integral sensor(s) such as accelerometer, gyroscope, other inertial sensor, a magnetometer and/or a barometer. Data obtained from a barometer may be utilized to determine changes in the relative altitude and/or, in conjunction with weather data, even to determine the absolute altitude of the device. In some embodiments, a temperature sensor may be used to estimate whether the device is located indoors or outdoors, for instance. Sensor data such as magnetometer data or other sensor data may also be stored as such or in processed form in the environment data of the probability map structures.

The inertial sensor data may provide an indication of various movement related parameters such as speed, velocity, acceleration, deceleration, turns, stops, etc. of the hosting mobile device, which is useful information in the light of e.g. motion models and their creation or application during positioning (estimation of current location through matching of environmental data against the model(s)). Magnetometer data, which may be gathered during mapping or positioning and associated with location data, may indicate external structures and objects causing distortions to the general surrounding magnetic field that is locally otherwise relatively static. Accordingly, certain locations may be associated with characteristic magnetometer data values optionally stored in the environmental data of probability map structures and monitored during positioning. Detection of such location-indicating values during positioning may add to the probability of the current location matching the location previously associated with same or similar values, for instance.

In some embodiments, the inertial sensor data may be used to determine the walking (gait) frequency, in case the mobile device is carried by a user moving by walking, by preferably filtering out noise and random variations from the data. Then by identifying the actual frequency, the frequency filter may be further adapted to separate consecutive steps from each other. By recognizing the walking frequency, the step/stride length may be determined and/or further calibrated by utilizing data, if available, from other sources such as e.g. GPS. This may then be utilized to enhance the locating of the device.

In some embodiments, the locating of the mobile device may be enhanced by utilizing inertial sensor data in recognizing the position of the mobile device, i.e., whether it is e.g. in user's pocket, next to user's ear while moving, or in user's hand. Accelerometer data in conjunction with gyroscope data may be utilized to identify to position of the mobile device with respect to the direction of gravity. The direction of the movement with respect to the direction of gravity and the position of the mobile device is typically approximately constant when the user is e.g. holding the mobile device in his hand while moving. The position of the mobile device may be calibrated with location data from other sources such as e.g. GPS, Wi-Fi or cell data. The position may also be calibrated by utilizing frequency filtered data of the movement of the mobile device in horizontal direction. With determined walking frequency and/or stride/step length in conjunction with the motion model, the accuracy of locating and mapping of the mobile device may be further improved. The acceleration in the direction of the movement may also be utilized and thus, the effect of random sidesteps to the locating may be minimized.

In some embodiments, a location estimate based on less accurate (according to the utilized predefined criterion) data such as environment data is adjusted by e.g. previously and/or later obtained more accurate data such as positioning data received in good navigation satellite coverage conditions. The accuracy may be dynamically determined for the data by estimating the measurement error. In satellite signal reception, e.g. number of satellite signals may be used to predict the accuracy/error. Having regard to environment data, e.g. number of data points obtained in parallel may be used to predict the associated accuracy/error.

More generally, in some embodiments, data, such as positioning data, considered more accurate (according to the utilized criterion such as the estimated margin of error) may be utilized to adjust data, such as sensor data, considered less accurate, or data derived therefrom (e.g. location data derived utilizing the sensor data).

For example, sensor data is associated with some sensor-dependent characteristic error margin or maximum accuracy, and in the case of typical inertial sensors, basically unavoidable drift, which results in accumulated error if used for positioning. Thus if such sensor data is used for positioning/route logging e.g. indoors and/or to associate other environment data such as cellular network based environment data (signal strength, etc.), or other sensor data such as magnetometer data with certain locations, the margin of error between the actual locations and locations calculated based on inertial sensor data increases in the longer run. If more accurate data such as GPS based positioning data is obtained e.g. at intervals, such more accurate data may be configured to correct the less accurate data such as environment data or location data associated with the environment data received in the meantime. More accurate data may also be further utilized to calibrate inertial sensors, even in real-time, as well as to post-process measured, less accurate data.

Correcting the previously captured environmental data, or (location) indications thereof, referring to e.g. location data derived from inertial sensor data, based on more accurate data such as apparently good quality satellite positioning data or other environmental data is particularly relevant in mapping or logging activities while constructing the probability map structure, wherein environment data such as cellular network based data or e.g. magnetometer data should be as accurately as possible associated with correct locations.

In some embodiments, offset compensation is applied to level out differences between environment data measured by multiple mobiles devices, caused by different data receipt or processing capabilities of the devices. Offset compensation may be applied in mapping activities as well as during locating (to make the environment and optionally positioning data obtained/provided by the current mobile device's comparable with predefined data such as probability map structure, motion model and/or route data). It may be detected that e.g. environment data captured or established by certain mobile devices differ from each other consistently in which case the compensation may, e.g., even out the substantially constant offset. In addition to offset in signal strengths, differences requiring compensation may also incorporate differences in gains and variances, which both may depend on the range of frequency. These may be automatically compensated or calibrated if reliable measurements are obtained at the same location from multiple devices. Sufficient measurements for calibration (offset, gain, variance) may also be used for other locations of the same cell.

The utility of the present invention arises from a great variety of issues depending on each particular embodiment thereof. Based on relatively low frequency and low amount of real-time data acquired, the mobile devices and thus also their users or other carriers, such as vehicles or other objects, may be positioned rapidly and accurately by relying on motion models in addition to the probability map structures and optionally route data. Furthermore, for example, cellular network data based positioning without at least constantly relying on Bluetooth, GPS or e.g. wireless local area network (WLAN) is very energy efficient in contrast to traditional solutions.

The motion models facilitate estimating the current and predicting the future location of the mobile device through fitting the environmental data, which is preferably obtained at a plurality of time instances (data representing certain single time instant only renders any true motion modeling or model fitting practically impossible as being understood by a person skilled in the art, because several samples with sequential temporal relationship should be available to make motion analysis meaningful), in the motion characteristics of the model(s) such as direction, speed/velocity, acceleration/deceleration, turns, etc. As a result, location probabilities determined based on the probability map(s) may be adjusted (probabilities changed) by one or more motion models so that the probabilities of locations matching well with the model are raised and vice versa.

Yet, the obtained location estimates may be of elevated accuracy as several data inputs of mutually different and/or similar type (e.g. signal strengths obtained from several base stations substantially simultaneously) may be utilized in parallel and in combination to increase the locating accuracy with reference to cellular network based data, Wi-Fi data, sensor data, etc. More accurate data may be used to adjust, or 'correct', data of lower accuracy. Still, also the data of lower accuracy may be exploited during the mapping and actual positioning.

Correspondingly, as several different data evaluation approaches such as motion models, probability map structures, route models, etc. may contribute to the locating, occasional erroneous data points do not seriously distort the location estimates, which generally remain very accurate.

By the utilization of sensor data readily available at modern mobile devices, both the mapping and locating accuracy may be enhanced or preserved in conditions wherein actual positioning data such as GPS data cannot be received and e.g. wireless network such as Wi-Fi or cellular network based data is not sufficient. For instance, mapping activities involving linking position data with environment data via a probability map structure may exploit explicit positioning data such as satellite positioning data in outdoors or other conditions of good coverage, and switch over to exclusive or parallel usage of e.g. inertial sensor data-based location estimation while continuing mapping of environmental data (e.g. cellular data, magnetometer data) indoors.

As one benefit of the suggested solution, different areas may be mapped in terms of signal or sensor data characteristics for future use in locating or other context, such as wireless network planning and optimization.

In addition to mobile users, officials such as police forces and different emergency units may be provided with tenable positioning, tracking and route data having regard to desired targets.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the claims. The invention itself, however, both as to its construction and its method of operation, together with additional objectives and advantages thereof, will be best understood from the following description of specific embodiments when read in connection with the accompanying drawings.

The expression "a number of" may herein refer to any positive integer starting from one (1).

The expression "a plurality of" may refer to any positive integer starting from two (2), respectively.

The terms "positioning" and "locating" are used herein interchangeably unless otherwise explicitly stated.

BRIEF DESCRIPTION OF FIGURES

The embodiments of the invention are illustrated by way of example, and not by way of limitation, in the figures of the accompanying drawings, of which

DETAILED DESCRIPTION OF THE INVENTION

Figure 1:
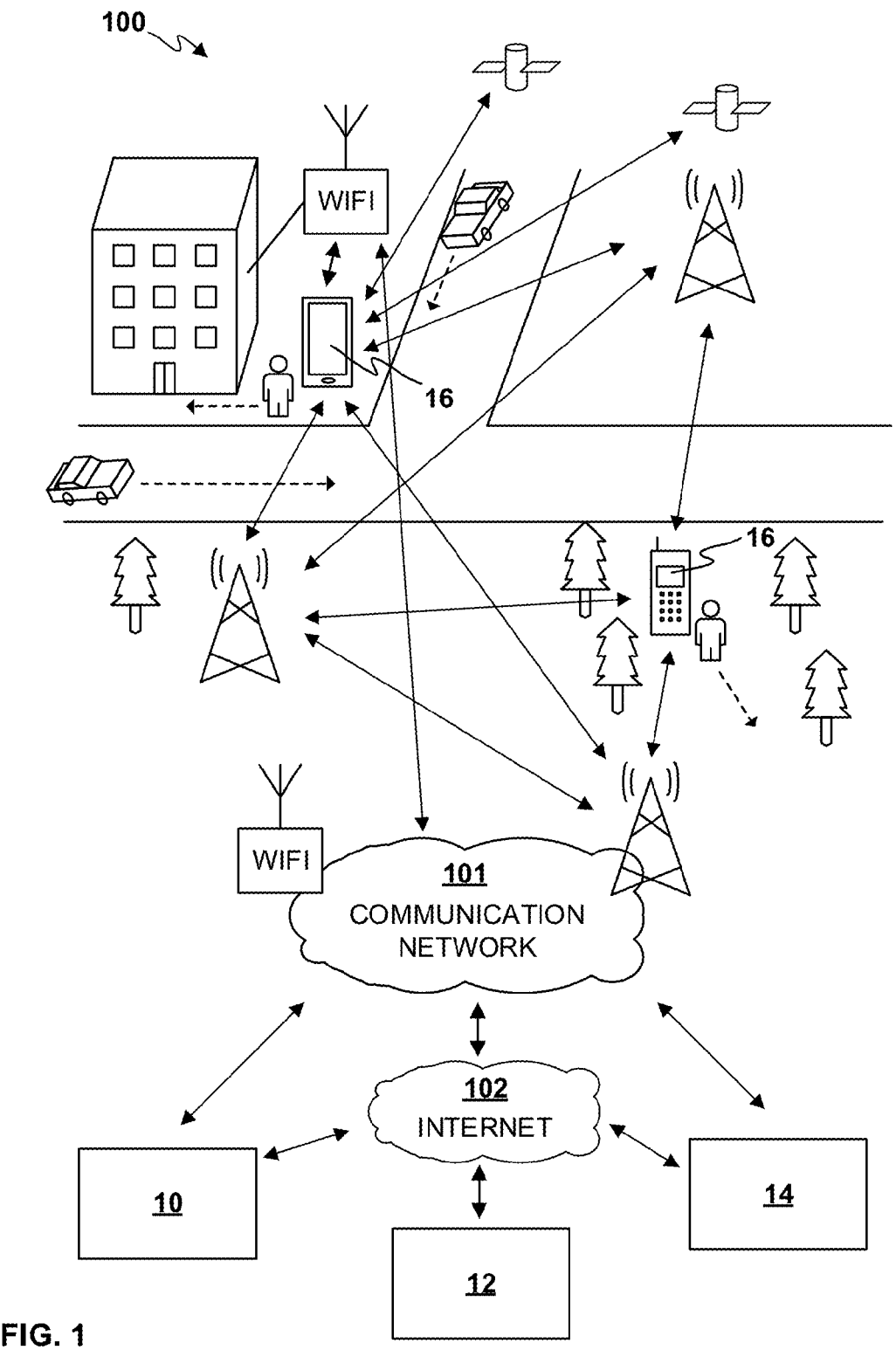
FIG. 1 illustrates schematically an arrangement for locating a mobile device according to an embodiment of the present invention.

FIG. 1 illustrates, at 100, an embodiment of the present invention via a merely exemplary use scenario thereof. The locating system may be at least partly disposed in a number of servers 10 residing as accessible via communications network(s) such as the Internet and/or cellular network(s). Optionally, a cloud computing environment 12 providing efficient and easy scalability of resources may be utilized to implement the system. In some other embodiments, the mobile devices 16 to be located may be self-contained in a sense that they may locally execute a locating method in accordance with the present invention preferably even if no Internet or other communications connection exists with elements 10, 12, 14 accessible via the Internet and/or other network(s).

In some further embodiments, the mobile devices 16 may be located by the (network) arrangement through utilization of information the mobile devices 16 provide to the network. At least part of the information may be such that it is transmitted by a mobile device 16 in any case. This means that the mobile devices 16 are not specifically arranged to provide information to the network especially for the locating purposes as they are, depending on the used wireless technology, anyhow reporting such data to the network e.g. upon request, continuously, at regular intervals, occasionally or periodically to enable the data being registered therein, for example, whereupon the same data may suffice or suit also for locating purposes in accordance with the present invention. This approach may find particular use in connection with emergency situations such as emergency, or '911', calls and finding of missing persons.

Indeed, the system is configured to locate mobile devices 16 such as wireless terminal devices, nowadays most typically smartphones, tablets, phablets, laptop computers, asset/vehicle tracking devices, Internet of Things (IoT) devices, etc. carried along by/in the possession of their users in an area of interest. Thus, the system may be considered as being capable of locating the associated users as well. Basically the overall area of interest may be global, regional, or local in terms of size thereof, and may further be divided into a number of sub-areas. The area(s) may incorporate different topography with natural and artificial features such as buildings as shown in the figure that may affect the environment data sensed by the mobile devices 16. Yet, the area may incorporate more dynamic or essentially temporary objects such as vehicles.

The mobile devices 16 may be connected to a number of wireless networks and components of related infrastructure at a time. Through such network connections, also the system may receive various data such as environment or positioning data from the devices. The components may include base stations of cellular networks and access points of WLAN networks, for instance. Yet, the mobile devices 16 may be capable of receiving explicit positioning data from an external source such as a satellite, which may refer to a GNSS (Global Navigation Satellite System) such as GPS, GLONASS, or Beidou (BeiDou Navigation Satellite System) or some geographically more limited alternative.

External sources 14, technically often embodied as servers or related services, may further provide data to assist locating activities. The sources may provide wireless network operation or configuration related information (e.g. cell tower location or configuration data), network or road traffic information, event information, geographical information, demographic information, weather information such as air pressure (e.g. for determining altitude) or temperature (e.g. whether the device is indoors or outdoors), etc.

The server 10 or the mobile device 16 may store all the received environment data and other data e.g. in the memory. Further, the server 10 is capable of receiving external data from external databases via receiving means. The external databases may be connected to the server directly or through Internet 102 or other such data communication network.

The data provided by mobile devices 16, external sources 14, and other entities can be stored as raw data and/or as physical area defined groups with reference to the aforementioned sub-areas specifying, for example, signal strength averages, relative and absolute weights of cell identifiers or signal strength, signal ranges, etc. The different types of data obtained from the sensors may be stored having regard to e.g. a certain location in the form of multimodal probability distributions due to the fact that, e.g. wireless signals may arrive via multiple paths to a certain location (multipath propagation).

In some embodiments, the arrangement or system of the present invention is realized by a number of network-connected servers 10 as mentioned hereinbefore.

The servers 10 may establish a remote service whereto the mobile devices 16 submit data and wherefrom they receive location estimates. Optionally, at least some actions considered as integral part of an embodiment of the present invention are executed already at the mobile device 16 to be positioned by client software, in which case the arrangement/system can be deemed to also contain the particular mobile device 16. The server for locating, i.e. the locating server, may be running on the mobile device itself as well as the server for modeling/mapping, which then enables offline use, thus avoiding possible expenses due to mobile data transfer and the power consumption due to the mobile data connection.

In preferred embodiments, the locating procedure may be based on a probability map structure that links environment data such as cell data to geographical locations (e.g. predefined geographic coordinates such as latitude/longitude data or Cartesian coordinates) with certain probability. The probability map structure may include and/or be derived based on independent observed environment data values and related positioning data. It shall be mentioned here that instead of single environment data points (e.g. sensed signal strength of wireless network), combinations of substantially simultaneously captured data points (e.g. signals from several base stations, sensor signal(s), etc.) may be associated with location data obtained e.g. from the GPS signal in the probability map structure.

In practice, the probability map structure, which is preferably Bayesian (which may apply to other probabilistic models of the present solution as well), may determine probabilistic environment data for geographical areas, e.g. predefined basic areas used as basic units for the positioning, e.g. 1×1 meter areas, which however do not have to limit the resolution of the locating. The probability value for certain, e.g. 1×1 meter area may be weight to a certain point on the 1×1 meter area and, by utilizing techniques such as interpolation, the probabilities may be defined also between these certain points of adjacent 1×1 meter areas. Resolution may then be adaptive in locations where larger than, e.g. 1×1 meter areas can be used without losing accuracy of the locating. Another method is to use small, e.g. 1×1 meter areas sparsely, and then indicate when the use of interpolation between two of such small areas is permissible in view of the statistics based on the collected environmental data.

Alternatively or additionally, the probability map structure may determine or host probabilistic environment data for area borders, certain locations/points and/or larger areas within or between which the desired more specific positions may be then associated, optionally in run-time fashion, with probabilistic environment data values by applying a suitable interpolation method on the border/point/larger area data, for example.

From the standpoint of the overall positioning arrangement or method, the probability map data may have been initially established during a mapping phase executed prior to a locating (positioning) phase by gathering reference data such as actual, explicit positioning data (e.g. GPS data) and corresponding (referring to same location at substantially same time instant) environment data such as cell data from a number of sources such as mobile phones or other mobile devices and optionally wireless network(s) such as Wi-Fi networks and/or cellular networks, and associating the two. For example, probability maps of different signal strengths may have been established accordingly. A single probability map may contain data for one or several environmental data elements and related location-based probabilities having regard to a predefined area. One or several probability maps may be utilized in a probability map structure.

The mapping data may be still be updated and revised during the positioning phase through collecting data (environment data and preferably explicit positioning data) from the mobile devices. Obviously, in some embodiments a mobile device such as a smartphone may be configured, instead of already participating in the mapping (which is of course possible as well), to begin utilizing the present invention directly from the positioning phase while a number of other mobile devices have been used for executing the mapping phase and thus establishing the initial probability map structure(s). The mobile device may be provided with client software that already contains or is at least configured to functionally (wirelessly) connect to a database or other data repository comprising the necessary data for probability map structure(s).

Accordingly, responsive to mapping depending on the distribution and routes of mobile devices occurred within the target areas, some areas may be associated with greater number of environment and positioning data points than the rest. This natural phenomenon (e.g. quiet/hard to reach locations with less data vs. active/central locations with more data) may be utilized in determining the probabilities or related accuracy/error estimates (i.e. more source/mapping data typically converting into more reliable signal estimate in the probability map and vice versa) for the target areas. However, even in active/central locations, movement of some devices may at least slightly differ from the previously collected vast amount of data. In these cases, once the evidence for the abnormal movement accumulates enough, the probability of the abnormal location for the device in question increases, but, naturally, affects only a little to the probability of the particular location of the probability map.

In some embodiments, the probability map structure may cover multiple geographical areas of different size, each area being associated with characteristics environment data values or data derived therefrom, and related probabilities. The areas may be adjacent and/or overlap/be nested. By using nested structures, the observation resolution of the map structure may be dynamically selected even during the positioning. For example, larger candidate areas the probabilistic environment data of which matches best the current environment data obtained by the target mobile device may be first determined, subsequently followed by comparing the sub-areas of such larger areas and associated probabilistic environment data with the current environment data to pick the best-matching sub-area(s) therefrom, thus gradually enhancing the positioning resolution. In that sense, a multi-level probability map structure with multiple vertical levels of different spatial/geographical resolution may be maintained and exploited.

Additionally, the mapping may continue during the positioning phase by updating the probability map structures based on environment data and optionally positioning data obtained during the positioning phase from a number of mobile devices and optionally other sources such as wireless networks.

During positioning, the distance of data points in the mapping data, i.e. data used for determining the probability map structure, from the locations the probabilities of which are determined may be taken into account so that greater distance converts to reduced weight in probability adaption and vice versa.

In addition to probability map structure linking environment data with location data, a number of temporospatial motion models are utilized in the locating. The motion models are preferably probabilistic models that capture and exhibit motion characteristic of motion types. As mentioned hereinbefore, they may characterize the motion by a number of parameter values such as speed, turn rate, acceleration, etc., and related probabilities.

A motion model may be associated with certain motion type and e.g. geographic area or area type and reflect its characteristics. For example, urban area related motion model may be provided with different probabilities for high speed travel than e.g. highway area related model (obviously higher speed propagation being more likely in highway area than in urban area or e.g. a specific walking area such as a mall or other indoor area). Accordingly, turn rate or speed value or value range probabilities may be different (higher rate turns are more likely in urban areas and vice versa) among different models as well. The environment data is thus fitted in the motion models and probability map structure to obtain location probabilities of the current position of the target device.

As mentioned above, a motion model may be utilized together with environment data and optionally positioning data obtained during the locating phase relative to at least the target device to be located. Such data may include current (latest) data points and history data. The history data refers to a plurality of temporally sequential data points such as environment data points obtained during the positioning prior to the latest ones. A plurality of different motion models may have been initially determined based on e.g. data gathered during a mapping phase, data received from external sources (e.g. the aforementioned map or street plan data) and optionally during the locating phase, said data being preferably collected from a larger population than just the target device to be currently located.

Further, route data, or route model data, may be established during the mapping and/or locating phase based on data gathered from a plurality of mobile devices.

The route data determines probabilities for different routes (indicative of sequences of environment data) and/or generally likely or unlikely locations within a certain area.

Supplementing the motion models, route data may be employed in the weighting of location probabilities for the currently located mobile device.

Environment data useful for locating a mobile device may be provided e.g. in Network Measurement Reports (NMR). The data may identify a serving cell and/or a number of neighboring cells relative to the mobile device 16, for instance. The data may include at least one element selected from the group consisting of: MCC (Mobile Country Code), MNC (Mobile Network Code), LAC (Location Area Code), TAC (Tracking Area Code, available in 4G LTE, identifying a tracking area within a particular network thereby reminding of LAC in 2G/3G) CID (Cell ID), PCI (Physical Cell ID, available in 4G/LTE), ARFCN (Absolute Radio-Frequency Channel Number), BSIC (Base Station Identity Code), CPICH (Common Pilot Channel), MAC (Media Access Control, MAC address) and RSSI (received signal strength indication). Also cell data may be stored with operator (MCC & MNC) identifiers and e.g. Primary Scrambling Code (WCDMA, Wideband Code Division Multiple Access)/ARFCN+BSIC (GSM) or other stable identifier(s). Also Base Station Identity Code (BSIC), System Identification Number (SID), Network Identification Number (NID) for CDMA based networks may be utilized. For Wi-Fi networks, BSSID (Basic Service Set Identification) and SSID (Service Set Identification) may be used. Particularly together their values may form an almost unique combination, even globally, for a particular location. PCI (Physical Cell Identifier) for LTE networks and/or corresponding parameters for 3G/WCDMA and 3G/TD (Time Division)-SCDMA (Synchronous CDMA) PSC (primary synchronization code) and Local Cell ID, respectively, may be utilized. Received signal strength (Rxlev), timing advance (TA) and radio frequency (RF) are also beneficial parameters for obtaining good locating accuracy, though not absolutely necessary.

Sensor data such as accelerometer, gyroscope, compass, air pressure, humidity, temperature or magnetometer and/or related contextual information (walking, driving, floor information, etc.) may be utilized to assist in locating the device. Data obtained from a barometer may be utilized to determine changes in the relative altitude and/or, in conjunction with weather data, even to determine the absolute altitude of the device. A temperature sensor may be used to estimate whether the device is indoors or outdoors. Magnetometer data may be especially useful indoors with the building, electromagnetic devices and different structures or objects causing changes in the magnetic fields measured by the magnetometer. These devices or objects introduce location specific changes to the magnetic field and can be used to locate the mobile device more accurately. The contextual information may be obtained based on the sensor data. Optionally, e.g. camera images or sound data (microphone signal, etc.) may be obtained by the mobile device and analyzed locally or remotely by means of Fourier transform or other applicable spectral analysis for detecting the frequencies of the different sound sources or pattern recognition technique(s) for the determination of location context or activity-context data for locating purposes in addition to potential other uses. Different sources generating noise such as motor vehicles, airplanes and/or human speech may then be recognized.

The position of the mobile device may be estimated based on determining the direction of gravity by using accelerometer data in conjunction with the gyroscope data. Then the direction of the movement may be determined from the horizontal acceleration with respect to vertical acceleration.

The inertial sensor data may be used to recognize the way the mobile device moves in order to assist in locating and/or in increasing the accuracy of the mapping. When the user carrying the device is walking, the typical walking (gait) frequency is approximately 1-3 Hz. The actual inertial sensor data may have measured noise, vibrations and random variations, which may be filtered out by using e.g. Butterworth filter and thus, enable clearer recognition of the walking frequency. Additionally or alternative, Fourier transform may be used to determine the frequency at which the walking/running of the user occurs. Furthermore, the determined walking frequency may be used to adapt the operation of the frequency filter which enhances the recognition of the steps and possibly the step/stride length of the user carrying the mobile device. The stride length may, however, vary. The calibration of the inertial sensor data may be done with data from other sources such as GPS, Wi-Fi or cell data.

By determining the position of the mobile device, the walking frequency, in case the user has been recognized as moving by walking, and the length of the step/stride, the locating may be further made more accurate. There may be generic motion models utilized which in some cases can be accurate, but there may also be user specific parameters determined. Accordingly, the users with same kind of devices can be distinguished from each other based on unique inertial sensor data such as certain patterns in accelerometer and gyroscope data.

Pattern recognition techniques may be used to analyze the inertial data of different users and, e.g., acceleration data can be divided into components of the direction of gravity and the direction of movement. The magnitude of the component in the direction of movement may then be analyzed to identify the pattern of movement. Additionally or alternatively, the magnitude and standard deviation of the accelerometer and gyroscope data may be analyzed, and based on the identified frequencies in conjunction with the identified patterns of movement, to determine the actual direction of the movement or to separate movement in vertical and horizontal direction.

Preferably, however, the environment data includes several aforementioned elements. Substantially transparent operator-end locating may be realized as the report data may be anyhow transmitted from the mobile device(s) 16 to the network, depending on the system.

Radio frequency data (from ARFCN/UARFCN (Universal Mobile Telecommunications System (UMTS) Terrestrial Radio Access ARFCN)/EARFCN (Enhanced ARFCN), for instance) can be used to improve the locating task. Identifiers such as LAC and CID are stored where available and are helpful especially for acquiring the first fix, but not necessary. Mobile devices may be configured to monitor e.g. various control channels in order to obtain cell data for the locating task in congruence with the present invention, or data applicable for determining it.

Further, in connection with 3G, e.g. UMTS (Universal Mobile Telecommunications System)/WCDMA, RSCP (received signal code power) or data derived using it may be applied for locating purposes. RSCP indicates the power measured by a receiver on a particular physical communication channel. It is used as an indication of signal strength at the current position of the mobile device, which may be used in estimating the location itself. Yet, particularly in connection with 4G/LTE, e.g. RSRP (reference signal received power) or data derived using it may be monitored for locating purposes.

RSRP indicates linear average power of the downlink reference signals (RS) across the whole channel bandwidth for the resource elements (RE, smallest basic element in data transfer on physical layer having regard to time and frequency) that carry cell specific reference signals. RSRP thus reflects the strength of cells at a current position of the mobile device. Many aforementioned data elements, e.g. RSCP and RSRP, are readily available in the mobile devices and in any case determined by component(s) therein, e.g. by a baseband processor or 'baseband chip', whereupon their further utilization does not really require heavy additional processing.

Multiple wireless communication technologies, or data from such, are advantageously cooperatively applied during locating of the mobile device 16. Several different technologies may be applied substantially simultaneously, alternately, etc. Few examples of generally applicable wireless technologies include 2G, GSM, 3G, 4G, LTE, WCDMA, TD-SCDMA, CDMA, EVDO (Evolution Date Optimized), TD-LTE, FDD (Frequency Division Duplex)-LTE, Wi-Fi-based technologies and Bluetooth, for instance.

For Wi-Fi, MAC or BSSID is one piece of preferred information. This can be associated with cellular data, where available, to distinguish e.g. globally overlapping MAC's. E.g. SSID names can also aid in this. Radio frequency is not needed, but can be used as an additional parameter. Wi-Fi access points or hotspots may also be blacklisted based on the names or part of the names of the access points. Hotspots to be blacklisted may also be recognized based on their signal distributions and geographical appearance.

Also calendar data such as specific time of day, week, month or year may be acknowledged in the analysis. E.g. wireless environment or traffic conditions (speed limits, etc.) may change accordingly, which may be statistically modeled and taken into account in locating of a mobile device.

The environment data may also include such data as population density in the area, land topography in the area, city size, and other such information in order to integrate this data to calculations of the probability map structure of the area of interest.

Regarding the applicable dimensionality of locating a mobile device in connection with the present invention, preferably at least two dimensions are taken into account.

Coordinates such as geographic coordinates (e.g. latitude, longitude) or Cartesian coordinates may be used to indicate position therein. Optionally, three dimensional positioning may be implemented with elevation type vertical data. The mapping data may be collected relative to a plurality of vertical layers or levels, or the unit used to indicate vertical data may be any preferred one, e.g. centimeter or meter.

Statistical weights may be associated with different environment data and different technology-specific probability map structures. Less weight is put to those location estimations, and corresponding cells, that seem to be inaccurate. These weights can be represented by weight factors (e.g. percentages) and these weight factors are used when calculating a final location determination. In this way emphasis can be put the on location estimations, and consequently the base stations/cells they represent, that give the greatest accuracy. This also allows that effects caused by possible errors due to a bad signal quality translating into considerable margin of error from part of the cells can be eliminated. Also the external data from the external databases, such as map, floor plan or street plan data, can be used in the positioning locating through weighting the location probabilities accordingly, for instance.

The obtained data may be applied in a locating task as combinatory entities, i.e. in combination with other similar entities, when applicable. Probabilities of different combinations may be determined. For instance, with cellular networks only certain limited combinations of cells can be visible to a mobile device at a time due to the limited coverage of a single cell and relatively static configuration and allocation of cell towers within an area. Therefore, combined processing may add to the reliability of the locating results.

Figure 2:
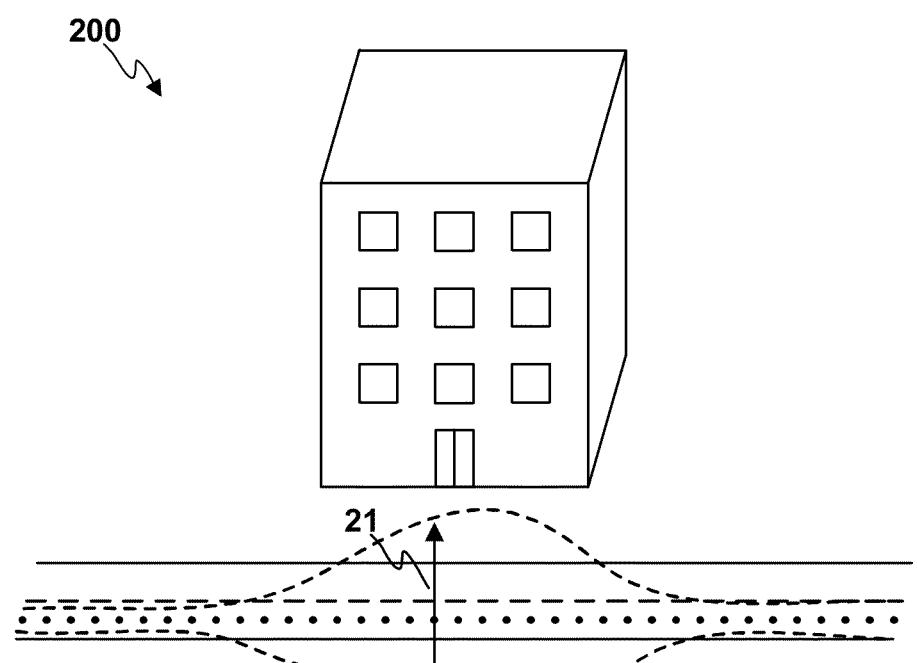
FIG. 2 illustrates schematically the effect of urban canyon formed by a building on the accuracy of GPS signal.

FIG. 2, at 200, illustrates one locating scenario according to an embodiment of the present invention when the accuracy 21 of, in this case, the GPS reception suddenly decreases as the signal path involves an area which has buildings blocking, scattering or reflecting the signals (only one building shown). As can be seen, the accuracy 21 of the signal utilized in locating is first high (narrowly spaced dashed lines) and then in front of the building increases (the distance between the dashed lines increases). The estimated route and the actual route according to an embodiment of the present invention match still relatively well due to the fact that the utilized probability map structures has a lot of incorporated data which is characterized, in this particular case, by direct motion with certain speed, which may be covered by the utilized motion models to compensate for the effect of bad environment or explicit positioning data (e.g. GPS data) in the final location estimate. Additionally or alternatively, in the case of low accuracy of GPS, locating may be enhanced by utilizing data e.g. from inertial sensors and motion models. It is further possible to identify the position of the mobile device with respect to the direction of the gravity and also with respect to the direction of the movement. As long as the position of the mobile device is not, varied e.g. in hand, and by recognizing that the user of the mobile device is walking or otherwise moving by foot, it is possible to identify the walking frequency and determine the probability of the movement in a particular direction.

Figure 3:
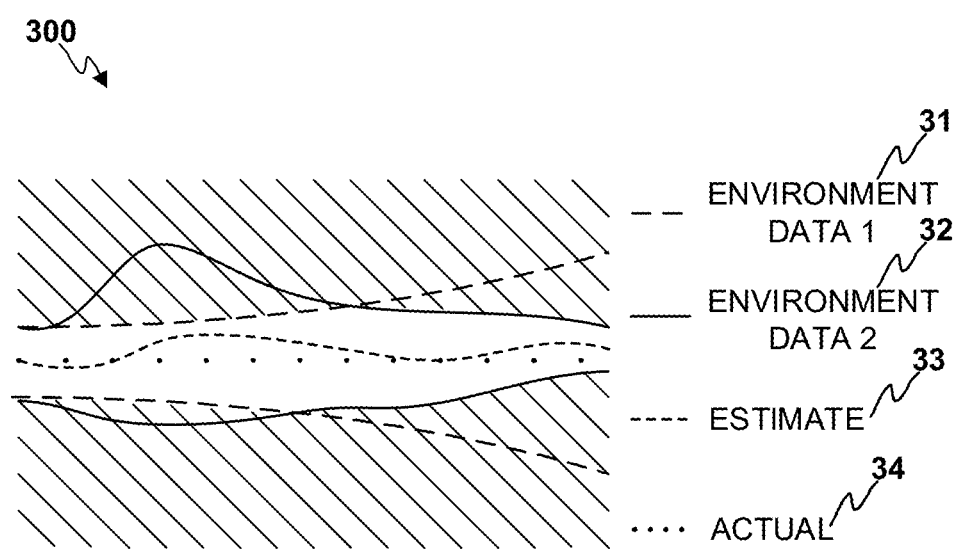
FIG. 3 illustrates a general principle of combining the location probabilities from two different sources in an example case according to an embodiment of the invention.

FIG. 3 illustrates at 300, as an example, how measurements from two different sources, i.e. different data inputs, affect the locating of the mobile device. In this particular case, the locating system obtains environment data 1 and environment data 2, marked with reference numerals 31 and 32, respectively. The accuracy of the data changes when going from left to right. The actual route 34 is marked with points and the estimated route 33 according to an embodiment of the present invention is marked with short dashed lines. The long dashed lines illustrates the accuracy of the first environment data 1 (31) and solid lines the accuracy of the second environment data 2 (32). As can be seen, as a combination of aforementioned two environment data, the estimate route matched quite well with the actual route. It can, however, be seen that even if the other one of the environment data would be missing, the estimated route would still be quite accurate due to the aggregation of different data points in the decision-making based on determination of most likely location estimate in view of current and previous environment and optionally positioning data points obtained, i.e. history data, as well as motion models and optionally route (model) data.

The routes investigated by embodiments of the present invention may be filtered to smoothen out the potentially abrupt transitions therein. E.g. Kalman filtering may be applied to estimate the movement and likelihood of features thereof (turns, going straight, etc.). Movement estimation results may be used for weighting the location probabilities. When such estimation procedure is applied together with other information known concerning the area in question, e.g. the locations of objects such as buildings, roads, or various obstacles, location probabilities may be further weighted.

As being clear based on the foregoing, the embodiments of the present invention preferably utilize, for the determination of the current location, also previous data in addition to the latest environment data provided by the mobile device. Therefore, data combining and aggregation takes places both in spatial/geographical and temporal sense. Current and previous location candidates may be utilized in calculating path probabilities in combination with the probabilistic temporospatial motion models leading at the current location candidates with maximum probability.

If additional environment data such as sensor data indicative of motion (e.g. acceleration, speed) is obtained, such additional data may be further harnessed to cultivate the probabilities. Movement of a mobile device has to follow the laws of physics (certain sensible limits for speeds, accelerations, changes in the rate of turn, heading, etc. can be defined) and be limited by the surrounding environment and related obstacles/features, whereupon also at least relatively reliable movement indications (which may be detected by matching an applicable motion model and environment data with sufficient fit according to predefined criterion) shall be utilized to weight the probabilities accordingly. Of course, even without any explicit movement sensor data or similar input, general guidelines may be limited for maximum speed, for instance, in each contemplated area of interest. For example, if the area type is urban or urban downtown, it is highly unlikely, practically impossible, that speeds in the order of magnitude of e.g. 200 km/h+ or related transitions do really occur. Such unlikely parameter values in terms of speed, acceleration, turn rate, etc. may be included in the established motion models with lower probability than e.g. lower speeds and milder acceleration/deceleration. A plurality of optionally mutually competing motion models for different types of motion (e.g. walking, running, car/motor vehicle model) and/or areas (urban, countryside, highway, etc.) may be indeed utilized with each positioning task.

Figure 4:
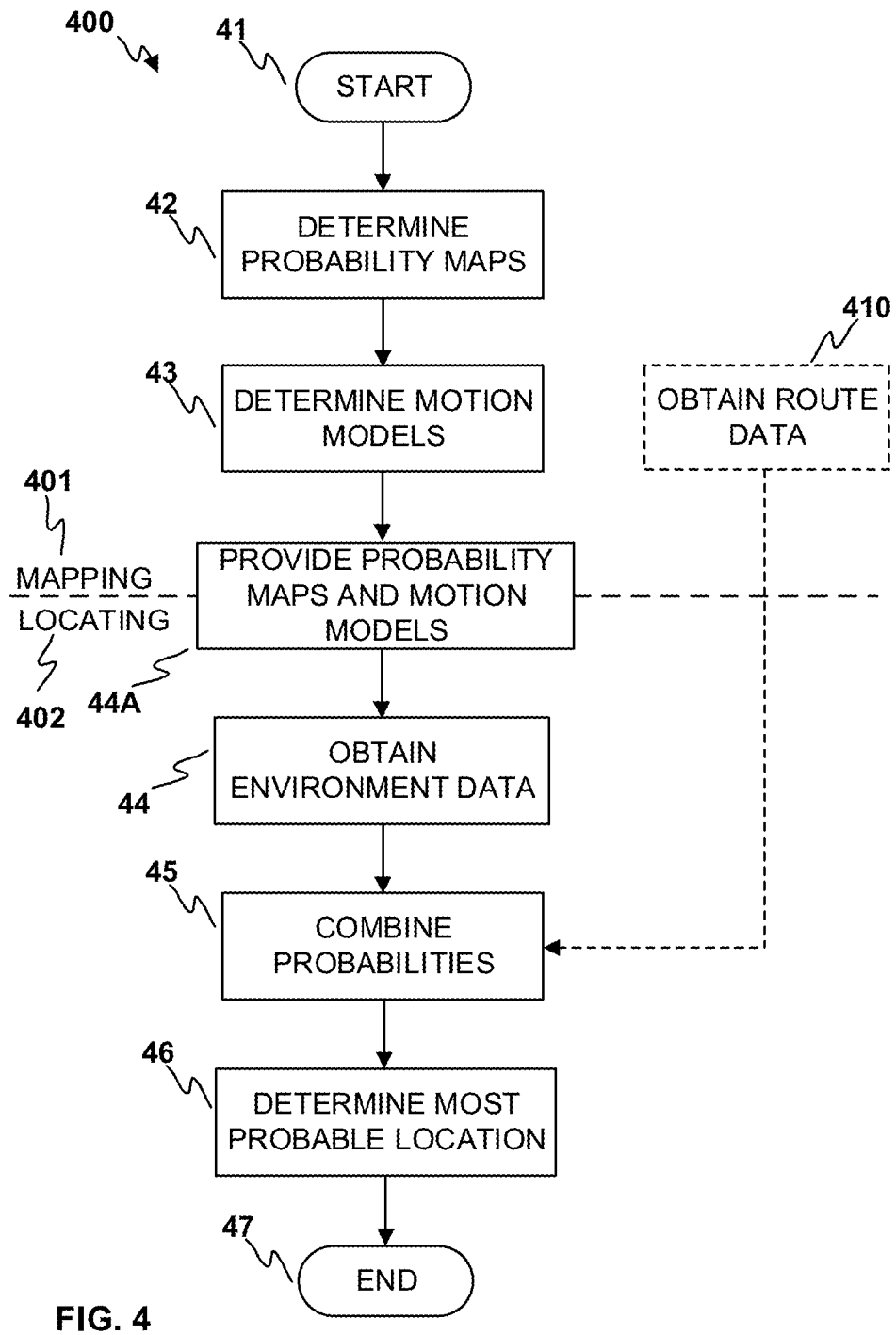
FIG. 4 illustrates schematically a flow diagram of the method according to the invention.

FIG. 4 depicts, at 400, a flow diagram disclosing an embodiment of a method in accordance with the present invention. At 41, indicative of start-up phase, various preparatory actions may be executed. For instance, different hardware elements and related software, such as mobile clients, locating servers, etc. may be ramped up and configured.

Item 42 refers generally to determining at least initial probability map structures or one or more components thereof having regard to the area of interest. These maps associate environment data with location data as explained hereinbefore. For example, covered area estimates for elements such as base stations may be determined, linking related environment data parameter values such as signal strength values with associated locations in a probabilistic manner.

At 43, the execution moves into determining probabilistic temporospatial motion models for different types of motion such as walking, running, bicycling, driving a car, etc. and optionally for different areas/area types.

Item 44A refers to provision of established, at least initial, probability maps and motion models to the device(s) such as mobile device(s) and/or network server(s) that use them for positioning mobile devices and implicitly the related host entities, such as persons or e.g. vehicles. The provision may be implemented by applicable communication interfaces, which may be wired or wireless. In a self-containing mobile positioning embodiment, for example, the mobile device may be provided, through wireless download or e.g. memory card based transfer, the necessary positioning software incorporating the maps and models. In case the positioning procedure is at least partially conducted on a server, i.e. a network server at least partially determines the position of the mobile device based on the environment data reported by the mobile, the server may locally host or remotely access the maps and models.

Item 44 refers to obtaining relevant real-time or near real-time (generally as real-time as possible) environment data, preferably at least cellular data. Also other available other data such as WLAN related data or local sensor data for locating of the mobile device is obtained.

At item 45, different location and movement associated probabilities of probability map structure, said motion models and the environment data are combined based on predefined rules so as to obtain the overall probability map for the current locating task.

Probabilistic temporospatial motion models basically affect the probabilities of different locations. By assessing the current location estimate(s) based on latest environment data with previously captured or generated environment data, probabilistic temporospatial motion models for different type of motion (walking, jogging, running, bicycling, driving a car, etc.) and/or for different area or area type may be assigned probabilities based on the observed motion of the positioned device in view of the environment data sequence perceived. The most likely motion model may be then determined based on the fit between the environment data and model characteristics, and utilized to weight the location estimates to find the most likely one.

In different embodiments, the combining may be thus executed by merging the effect (adaptation of location probabilities), or contribution/output, of additional models (e.g. motion model and optional route data/model) into the probability map.

From a mathematical standpoint, each probabilistic model, e.g. probability map, motion model and optionally route model, may be utilized to generate, maintain or store a probability describing function such as mass function, cumulative distribution function or density function indicative of location probabilities and related characteristics. Such probabilistic functions provided by several models may be combined during positioning to yield the final location probabilities.

At 46, the most probable location of the mobile device is determined based on predefined rules/criteria. These may include methods such as interpolation or extrapolation. Typically the location with highest probability is selected as the most probable location estimate.

Finally, at 47 the method is concluded. This method item may include storing the information in memory of a device or providing the location information to a user device in an appropriate form or may include sending the location information to external device/system.

There may also be an optional feature which obtains route (model) data 410 related to different routes on the map. Different routes and generally locations may have different basic probabilities associated therewith as has been discussed herein earlier. For example, walking in forest along an existing trail is much more probable than walking in the surrounding swamp. These probabilities are determined based on mapping/modeling phase data, data provided by previously located mobile devices or data obtained from an external source such as a digital map of the area.

The method may further be coarsely divided into mapping/modeling 401 and locating 402 phases which in different embodiments may be substantially separate or mixed with various degrees. It may be configured such that the mapping phase is more of determining static or initial probability map structures and probabilities related to the probabilistic temporospatial motion models and then the actual locating is done by obtaining environment data and exploiting the already available mapping data such as temporospatial motion models and probability map structures. Or alternatively, it may be that the probability maps and motion models are updated as the mobile device captures or determines environment data, yielding rather dynamic probability maps and probability values determined by the motion models.

Ultimately, a skilled person may, on the basis of this disclosure and general knowledge, apply the provided teachings in order to implement the scope of the present invention as defined by the appended claims in each particular use case with necessary modifications, deletions, and additions, if any.

Figure 5:
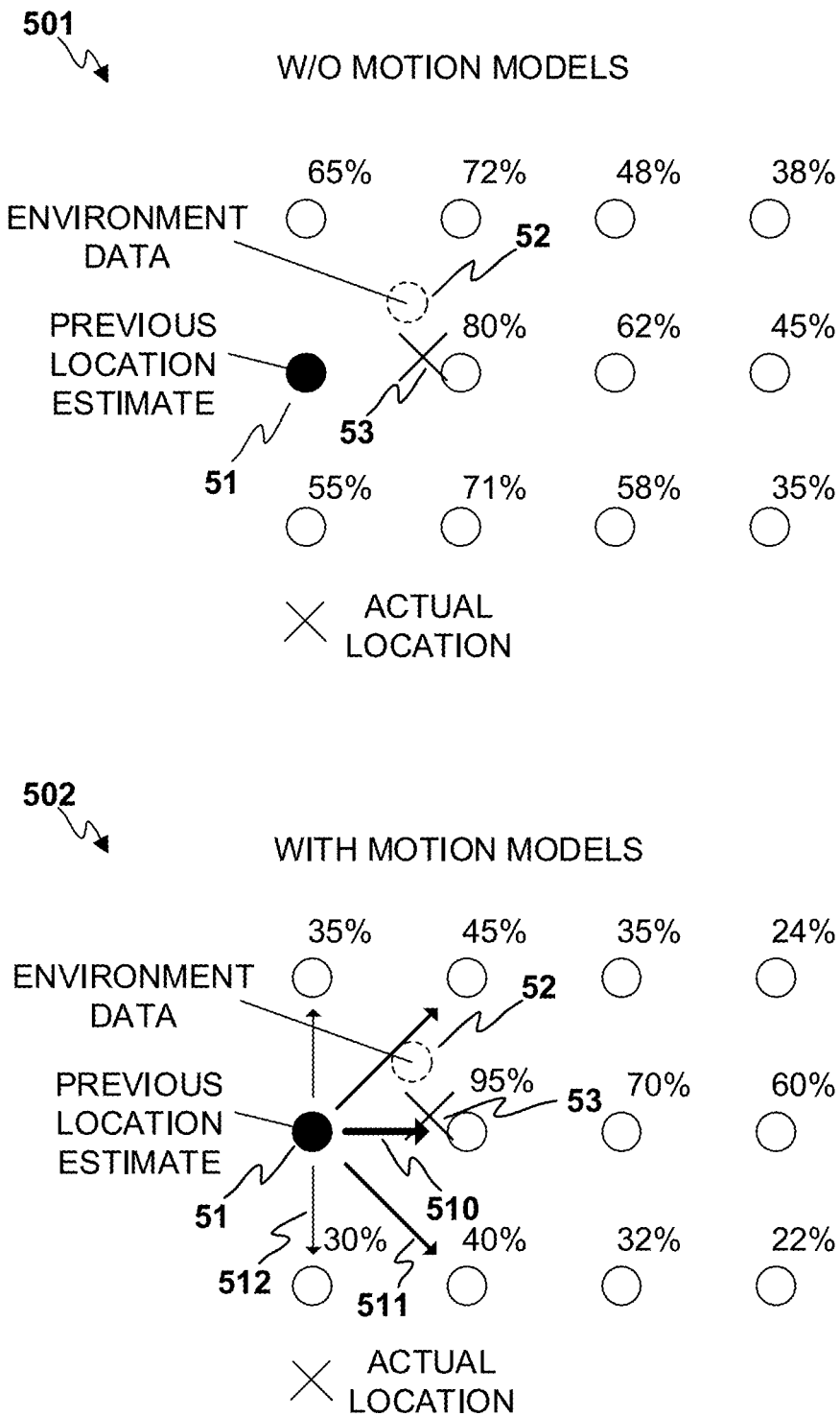
FIG. 5 illustrates schematically the effect of probabilistic temporospatial motion models on probabilities according to which the location of a mobile device is being determined according to the invention.

In FIG. 5, the probabilities of certain locations are indicated as percentage type scores. In order to schematically illustrate the effect of the probabilistic temporospatial motion models, the probabilities are shown in the top FIG. 501 of FIG. 5 without utilizing said motion models.

Location (e.g. geographic location coordinates) associated probabilities obtained from the probability map structure have been essentially utilized with respect to the obtained environment data and previous location point(s) 51 relating to the mobile device being currently positioned. These certain locations shown in the figure as clear circles with associated probability scores generally in a matrix type form may represent e.g. the location points explicitly indicated by the positioning data obtained during mapping, for instance, or location points derived based thereon using e.g. interpolation or extrapolation, or other processing, technique(s). The location 53 refers to the actual current location of the mobile device to be positioned, while the location 52 indicates the positioning result obtained based on the application of probability map structure to map current environment data, such as cell data, captured and optionally processed by the mobile device into a location estimate.

The effect of probabilistic temporospatial motion models in FIG. 5 can clearly be seen when comparing the percentages in the upper FIG. 501 to ones in the bottom FIG. 502 in which the updated percentage scores are shown, established utilizing also the motion models. The probabilities of the transitions between previous and current location are illustrated by the arrows and related, different thicknesses 510, 511, 512. The most probable direction of the movement in this particular case has been from left to right at a certain speed, i.e. velocity 510.

In various embodiments, the cultivated probability map structure such as shown in FIG. 5 is thus established by comparing the obtained environment data relating to the mobile device currently positioned to the location associated environment data obtained in the mapping phase. This may include, e.g., cellular network related signal strength values, different aforementioned codes and/or IDs. There may also be, at least occasionally, typically rather accurate GPS signal available for utilization in the locating of the mobile device. Also as stated earlier local sensor data may be exploited. Further, as shown in the bottom figure of FIG. 5, probabilistic temporospatial motion models are preferably utilized as well as potential route models or other available route data. As a combination of the probabilities of the aforementioned, the aggregate probability map structure with location associated percentages is then obtained.

The combining of the different technology-specific probability maps may be done directly with or without further weight factors depending on the accuracy or another characteristic parameter of the locating data. This may clearly be the case for technology-specific probability maps having location associated probabilities. Or, alternatively, specific locating data may be chosen as a primary locating data, the probabilities of the location estimates of which are then adjusted by using another location data, considering e.g. models defining probabilities for transitions. In these cases, the transition probability can be arbitrary without a location estimation data defining or limiting first the location to a certain area or part of the map, for instance. The chosen primary data may generally be the most accurate locating data, or a preferred locating data source may be chosen as the primary locating data.

Figure 6:
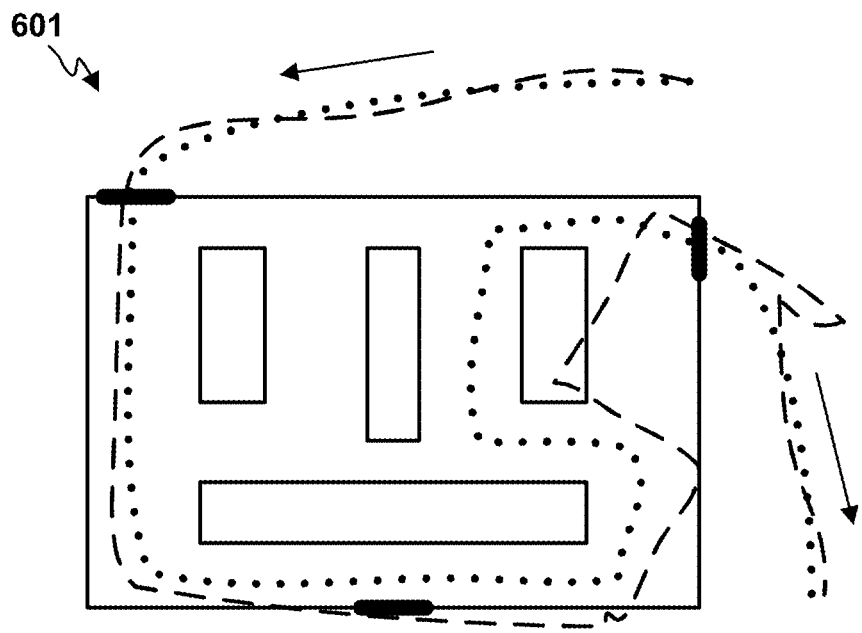
FIG. 6 illustrates schematically an example case of locating of a mobile device indoors with assistance of a local sensor according to an embodiment of the present invention.
Figure 6:
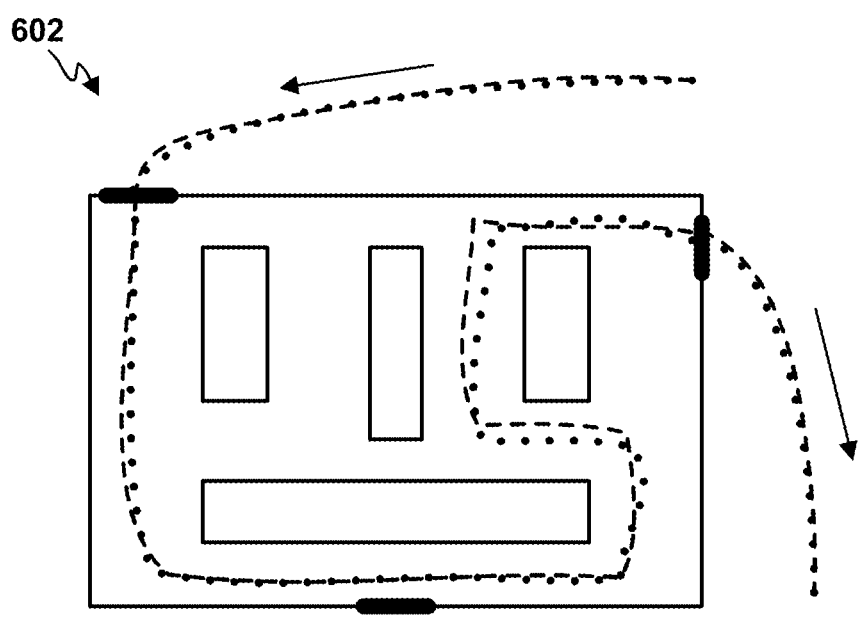

FIG. 6 illustrates the operation of an embodiment of the present invention when positioning a mobile device in a particular case, with at least a certain period of time, indoors. A skilled person shall acknowledge based on the foregoing, this type of positioning may also take place during the mapping phase, i.e. when a probability map structure is provided with location associated environment data.

As can be seen the mobile device first move outdoors in which, in this case, GPS signal with high accuracy is available. The estimated route follows the actual route quite accurately. When the mobile device moves indoors, the GPS signal is lost and the positioning is then based, in this case, on utilizing cellular network and e.g. local inertial sensor such as accelerometer data. The positioning becomes highly affected by the accelerometer data. As can be seen, the positioning may become particularly distorted and the route or path starts to drift away from the actual route. The characteristics of the movement, such as e.g. turns around corners, may be determined by utilizing gyroscope data or by using pattern recognition techniques for accelerometer data. The data from other sensors such as e.g. from accelerometer may be used to calibrate the gyroscope measurement. Also known, accurately determined locations (e.g. by GPS or environmental data) may be used to calibrate inertial sensors.

If any other mobile device has not been located in the building before, the estimated route of the mobile device is easy something like in the top FIG. 601. However, if a number of mobile devices have already been located in the building in question, which means the mapping data such as probability map structure is more up-to-date and comprehensive, more accurate, adapted route shown in the bottom FIG. 602 may be obtained through the utilization of the probability map structure and e.g. motion models. In both cases described above, once the mobile device exits the building and GPS fix (or some other more accurate location data) is once again available, the location estimations are quickly restored or in the latter case continued to be closer to the actual location of the mobile device positioned.

In case the mobile device is switched on indoors and then, after a time period, switched off also indoors without leaving outdoors during the time period, there may not be an accurate reference point having regard to which calibrate the inertial sensors. The reference point may, however, be determined afterwards when another mobile devices come e.g. from outdoors to inside the building. The measured data in case of the mobile device switched on and off indoors may then be used to locate other devices indoors. Also the route of the mobile device originally located can be adjusted afterwards. Also instead of locating a single mobile device, pattern recognition techniques such as dynamic time warping or Bayesian methods may be used to determine probability of overlapping paths of multiple mobile devices.

The determination of the most probable location according to the present invention is based on utilizing environment data from at least one source, e.g. cellular network related information. However, the suggested method may preferably utilize data from several sources in a combinatory fashion. The determination of the combined probabilities of different location estimates may be based on various methods such as ant colony optimization, stochastic diffusion search, particle swarm optimization, genetic algorithm, least squares, Cramér-von-Mises, fuzzy logic, neural networks or any other known method for solving the problem related to estimating the location of a target entity or element, such as an electronic mobile, typically also hand-held or wearable, device.

In various embodiments, the data obtained at the current location, at previous locations, etc. may be used to adapt the probability map structure, the probabilities of the probabilistic temporospatial motion models and e.g. route data. This way the probability map structure and optionally other models can be made to adapt to changes in the signal and actual environment due to, e.g., changes in base station signal power, permanent or temporary placed physical objects thus enabling having up-to-date mapping data for positioning. The adaption may take place locally at each mobile device and/or centrally on network side elements, such as server(s), wherefrom adapted mapping data such as basic or initial probability map structures for different areas may be optionally distributed to client mobile devices instead of or in addition to local use.

Data relating to each locating technology or data input type (explicit positioning data provided by e.g. GPS, cellular, Bluetooth, Wi-Fi, or other wireless network based data, sensor data, etc.) may still be partly independently utilized and related technology-specific probability map structures established, but at least the final decision making about the most probable location estimate shall preferably combine information arisen from each available technology-dependent analysis.

Accordingly, even if technology-specific data and probability maps are exploited, care is taken to ensure the final mutual compatibility thereof by a predefined merging logic. Additionally, the logic may be configured to weight the mutual importance of different data sources and/or models based on e.g. their estimated reliability or error margin. A data source may be associated with a certain level of trust, which is then applied in adopting or utilizing the information during mapping or locating as an emphasis factor, for instance.

In various embodiments involving the preliminary mapping phase enabling subsequent positioning activities, measurement data including positioning data (e.g. GPS) and associated environment data, optionally cellular data, is generally obtained. Different statistics, part of which are technology-specific, may be then (pre)calculated for subsequent use in connection with positioning tasks. For instance, for a location the occurrence probabilities of different cell signal strengths or other environmental data elements or parameters (values) may be determined.

Again, different models with different parameters and/or determination logic may be constructed for different technologies during the mapping phase, but at least during the locating the technology-specific considerations are ultimately combined to obtain a common estimate for the location of the mobile device.

No mapping is advantageously completely nullified, however, unless clearly erroneous or if there is a high volume of mapping in the area and it clearly doesn't match with the rest. On the other hand, when more recent measurements start to make the previous data look outdated and invalid, the invalid data shall eventually be dropped out.

Permanent-appearing changes may be verified prior to being completely accepted by the mapping or positioning system through parallel usage of two or more probability map structures regarding the same area and/or related features (e.g. cell signal strengths, timing advances, etc.) that could be considered as competing. The detected instant of a major change in the tracked features may be applied as the creation instant of a new map structure. When the change seems permanent according to the criterion used, the previous map structure may be discarded or classified as inactive, and switched over to the new one, also in locating.

In various embodiments, upon creating or adapting the probability map structures, statistics for constituting or populating the probability map structure are established based on the obtained measurement data including, e.g., GPS and temporally substantially corresponding environment data. Different (sub-)areas within the overall area of interest may be formed by finding unitary characteristics among geographically close data points. Unitary characteristics may refer to similar signal values such as cell signal power or generally similar rules, formulae or logic, e.g. in terms of signal attenuation or generally wireless environment, which the locations in the area seem to follow in respect of the monitored features.

Error associated and possibly indicated with GPS data (e.g. GPS error estimate) may further be used to weight or prioritize the corresponding environment data when applied in modeling. Yet data source reliability information may be applied in processing or weighting measurement data. As a concrete example, professionals (e.g. cartographers) with professional gear may provide at least some measurement data, whereupon such data may be deemed more reliable and given more weight than e.g. data from volunteers with ordinary consumer electronics type measurement equipment. Nevertheless, crowdsourcing is one valid option for obtaining large amounts of data with minimal effort. The data gathered may be used for updating the probability map structure only or for updating the probabilistic temporospatial motion models as well or vice versa.

When the obtained data contains user-inputted (manual) information such as indication of the location (may be free-form text "I'm at the crossroad of West 7th Avenue and Bank street" or e.g. coordinates or other more specific location input based on e.g. selection of a location via Google Maps™ or other interactive map feature), less weight/more room for error may be allocated for such location announcement than with purely machine-determined locations. Between professional and hobby/volunteering mappers, similar weighting may be applied to manually input data.

As mentioned hereinbefore, also during mapping, the GPS or other data provided by other mobile devices may be utilized to update the probability map structure and related probabilities as well as the probabilities of the probabilistic temporospatial motion models.

In various embodiments, mapping the area in question may be repetitive, iterative background process that is executed when new measurement data such as environment data is available, which may also occur during the so-called locating or positioning phase. As one understands, also explicit positioning data such as GPS data may be obtained during the positioning phase, which enhances both the positioning accuracy and potential continued mapping taking place in the mobile device itself or in one or more network elements whereto the mobile device is configured to transmit the necessary data.

Accordingly, as the wireless environment in the area may sometimes considerably evolve over time due to various changes in the network configuration, traffic conditions, grid plan, etc., such major changes may be reflected by the latest data, and be at least gradually tracked and detected by the present invention according to predefined logic. Occasionally, major changes noticed are due to errors in mapping or indicative of just temporary change or daily fluctuation. Even climatic conditions may sometimes seriously affect the measurements.

However, errors in mapping (arising e.g. from the GPS) or positioning (e.g. local disruption in network coverage) appear typically in random or semi-random manner. Often these situations can be predicted based on e.g. GPS accuracy estimation data indicating bad quality or other factors listed above, and given low priority in locating, but when such an error goes unnoticed, its effect can often be minimized by its highly improbable association with the surrounding mappings (determined from low weight in comparison to other mappings around it).

When adapting the probability map structures and/or the probabilities of the probabilistic temporospatial motion models, a current time stamp is preferably included in or associated with the changes or new entries of the gathered database to enable estimating the temporal or historical validity or timeliness thereof.

In a computer program according to an embodiment of the invention there is arranged a program code means adapted to perform any of the method items described above when the program is run on a processor. The program may be delivered on a carrier medium that may be non-transitory, such as a memory card, memory stick or optical disc. The program can be embedded in the processor of the mobile device 10 and/or the server 14, or distributed among a plurality of devices such as servers, or server(s) and mobile device optionally as a wireless or wired signal. Few examples of generally applicable wireless technologies include 2G, GSM, 3G, 4G, LTE, WCDMA, Bluetooth and Wi-Fi-based technologies, for instance. These technologies may be applied for both information transfer between the mobile devices and network entities such as servers and acquisition of environment data.

Figure 7:
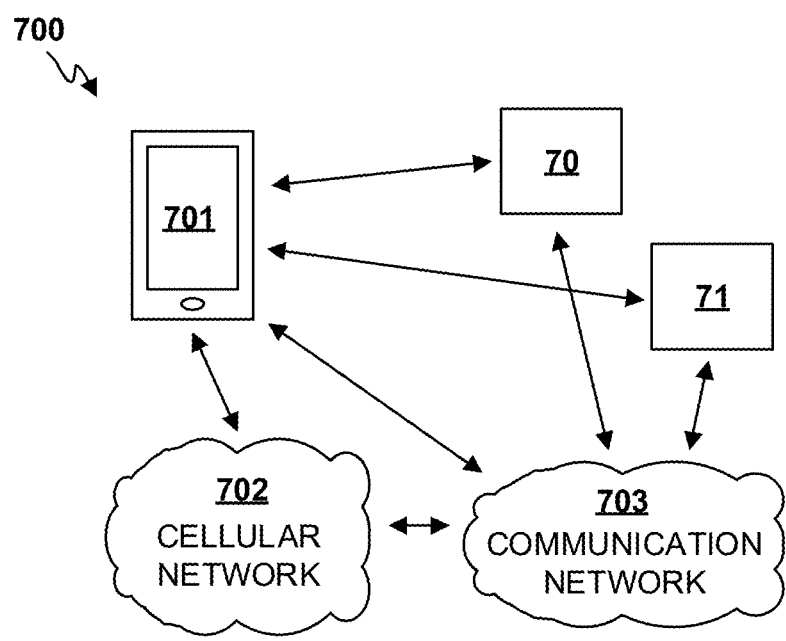
FIG. 7 illustrates schematically an arrangement according to an embodiment of the invention.

FIG. 7 shows a block diagram 700 of an arrangement for locating a mobile device 701 in connection with at least one wireless network such as a cellular network 702 according to an embodiment of the invention. The location of the mobile device 701 is thus monitored when it is moving or in a stationary state. The mobile device 701 comprises a first communication entity or unit for receiving and transmitting wireless, preferably at least cellular communication network signals, e.g. GSM, GPRS (General Packet Radio Service), 3G/CDMA (Code Division Multiple Access), 4G, and/or 5G signals. The first communication entity comprises at least one cellular receiver with associated antenna. The first communication entity may comprise one or more receiving means for different cellular communication networks and it is capable of receiving signals from cellular networks operated by different operators. The first communication entity may also comprise a cellular transmitter that is operable to communicate with a remote station such as a server through a cellular communication network. The cellular transmitter is operable to transmit data from the mobile device to the remote station. The cellular receiver and transmitter may be integrated in a single component.

The mobile device 701 may also comprise a second communication entity for receiving e.g. satellite-based (explicit or actual) positioning signals, e.g. global positioning system (GPS) signals. The second communication unit may comprise at least one GPS receiver and associated antenna. The explicit (originally intended for positioning) positioning signals may be applied in both mapping and positioning activities as described hereinbefore.

The mobile device 701 may comprise a third communication entity operable to send and receive data based on Wi-Fi-based technologies such as WLAN.

The mobile device 701 may also comprise a number of local sensors measuring internal or external parameters of the mobile device 701 such as accelerometer, gyroscope, compass, magnetometer, air pressure, humidity and/or temperature sensors. The measured environment data of local sensors such as inertial data may be used in the locating of the mobile device 701. The local sensor data may also be sent by utilizing communication entities, e.g., to an external server for use in mapping or positioning.

The mobile device 701 may be configured to receive positioning data received from the satellite of the satellite-based positioning system and environment data of cellular communication network received from a plurality of base stations belonging to at least one cellular communication network. According to another embodiment, the mobile device comprises, instead of or in addition to the second communication unit for receiving satellite-based positioning signals, receiving means configured to receive and collect information corresponding to positioning data, e.g. GPS coordinates, from external element residing e.g. in a communication network (e.g. server).

Mobile device comprises at least one processing element such as one or more (micro)processors, micro-controllers, DSP's (digital signal processor), programmable logic chips, etc. may be provided.

The mobile device also comprises a memory capable of storing executable instructions in the form of e.g. client mapping and/or positioning computer program and other data such as model data, probability map data, signals received through receiving means such as a GPS receiver and cellular receiver, or from local sensors. Components which combine functionality of any of the above mentioned elements may be used.

The processing element may thus be configured to execute the computer application code stored in a memory, which may imply processing instructions and data relative to a number of application(s) or software modules/entities associated with the present invention for mapping/modeling and/or positioning. The memory may be divided between one or more physical memory chips or other memory elements. The memory may further refer to and include other storage media such as a preferably detachable memory card, a floppy disc, a CD-ROM (compact disc read only memory), DVD (digital versatile disc), Blu-ray™, or a fixed storage medium such as a hard drive. The memory may be non-volatile, e.g. ROM (read only memory), and/or volatile, e.g. RAM (random access memory), by nature. The processor and the memory can also be integrated together.

A UI (user interface) may be provided and comprise a display, and/or a connector to an external display or a data projector, and keyboard/keypad or other applicable local control input means (e.g. a touch screen or voice control input, or separate keys/buttons/knobs) configured so as to provide the user of the arrangement/device with practicable data visualization and device control means.

The UI may further include one or more loudspeakers and associated circuitry for sound output. Yet, a remote UI functionality may be implemented by means of a web server and web site operated thereat, for example. For the purpose, data transfer interface(s) may be utilized. Alternatively, different APIs (application programming interface) may be provided to access and use the elements and data of the present invention.

The arrangement preferably comprises a mapping entity 70 capable of receiving environment data and positioning data in order to obtain, by necessary calculations, for example, at least initial probability map structure(s) that may include e.g. covered area estimates for different base stations and related parameters (e.g. signal strength value maps with associated probabilities). The mapping entity 70 may be further configured to obtain a number of probabilistic temporospatial motion models. The mapping entity may be further configured to obtain location associated route data and e.g. route models for locations/areas.

The arrangement preferably comprises a positioning, or locating, entity 71 for collecting at least environment data so as to compare the at least environment data with previously stored, environment data-related, location data via the probability map structure(s) and to determine to most probable location of the mobile device.

According to an embodiment of the present invention, the mobile device 701 to be located is configured to execute positioning substantially autonomously or in a stand-alone fashion, which means it may still receive data such as environment data from external sources such as wireless networks but determines the location estimates substantially locally. This implicitly means that the mobile phone has beforehand obtained the probability map structures and probabilistic motion models and stored them in the memory. The locating is then performed in the mobile device 701 in connection with the cellular network 702 itself without a need to connect to an external server or system. At least static copy of the probability map structure, or relevant (e.g. geographically limited) part thereof, and e.g. probabilistic temporospatial motion models and the necessary locating logic may have been thus deployed at the mobile device as a software product (computer program product). A suitable form of computer software, e.g. a positioning client application or a local instance of a positioning server entity, may be downloaded thereto to enable e.g. stand-alone positioning feature not requiring, at least continuously, the usage of or active connection to a number of remote service(s) or server(s).

In an embodiment according to the present invention, especially in the case of an arrangement with a mobile device to be located and one or more server(s) connected to the communication network 703, the arrangement may also comprise communication over wired network interface(s) such as local area network (LAN) (e.g. Ethernet) interface. In this case, the locating is at least partly performed at the server(s) and the necessary data captured by and in the possession of mobile and/or other device(s), e.g. environment data, may be then transmitted to the server(s) either as directly addressed thereto or via rerouting network elements such as cellular base stations, switches, or gateways for use in positioning. The server(s) may obviously return location data to the mobile device for visualization on a digital map display, for instance. Additionally or alternatively, the mapping entity may be configured to run at the server(s) by data provided by mobile devices and potentially additional entities such as base stations.

The arrangement may thus in some embodiments be implemented as a combination of several elements including e.g. a mobile device to be located, communication network, preferably, cellular network and at least one server. The mobile device typically determines or captures at least environment data which is further send to a server via cellular network a server or several servers. The data may include cellular network based data such as signal strength data. The server then compares the environment data with earlier stored, analyzed and modeled data utilizing e.g. probability map structure(s) and probabilistic temporospatial models. The server combines different location and motion associated probabilities and determines the most probable location of the mobile device. The most probable location of the mobile device is then sent to the mobile device via cellular network.

Based on the foregoing, various embodiments of the arrangement of the present invention may be realized by a mobile device, a network accessible element such as server(s), or by a combination of both, among other potential options.

In the embodiments of a method, computer program and arrangement described above the mobile device(s) used in the mapping phase may be other mobile device(s) than the one(s) used in the actual locating phase. As an example the former mobile device may comprise the GPS receiver or other explicit positioning data receiver, and the latter mobile device may not have to comprise any particular positioning data receiver. This is because there is no absolute need to receive explicit positioning data in the actual location determination phase, although receipt thereof often enhances positioning results.

Features described in the preceding description may be used in combination other than the combinations explicitly described herein. Although various functions have been described with reference to certain features, those functions may be performable by other features whether described or not. Even though certain features have been described with reference to certain embodiments only, those features may also be present in other embodiments. Vice versa, all disclosed features do not have to be present in all feasible variations of a certain embodiment as being appreciated by a person skilled in the art.

The invention claimed is:

1. A method for locating an electronic mobile device capable of wireless communication, the method comprising:
   obtaining a probability map structure for an area of interest, said probability map structure associating environment data values with location data;
   obtaining a number of probabilistic temporospatial motion models for different types of motion, said models at least partly defining transition probabilities between location estimates relative to time;
   obtaining at least environment data captured or determined by the mobile device at a plurality of sequential time instances; and
   determining the most probable location estimate of the mobile device based on combining probability data from both the probability map structure and said motion models,
   wherein the at least environment data is best fitted in the motion models and probability map structure according to predefined criteria.

2. The method of claim 1, wherein at least one temporospatial motion model of said number of models includes one or more elements indicative of at least one motion characteristic selected from the group consisting of: speed, velocity, speed fluctuation, velocity fluctuation, acceleration, deceleration, turn rate, turn frequency, linearity of motion, stop, stop duration, stop frequency, direction change, direction change frequency, and direction reversal.

3. The method of claim 1, wherein said number of temporospatial motion models comprises a model for at least one motion class selected from the group consisting of: walking, crawling, immobility, running, cycle, motor vehicle, car, motorcycle, train, and bus.

4. The method of claim 1, wherein said number of temporospatial motion models comprises a model for at least one geographical area or area type selected from the group consisting of: urban area, countryside, pedestrian area, pedestrian street, highway, forested area, and indoor area.

5. The method of claim 1, wherein at least one temporospatial motion model of said number of models defines a limit or range for a motion characteristic beyond which the probability of the characteristic is substantially zero in said model.

6. The method of claim 1, further comprising mapping an activity incorporating determination of at least an initial probability map structure or a source data structure therefor through obtaining environment data and temporally substantially corresponding, location-indicating reference data and linking the environment data with the location data provided by the reference data,
   wherein the environment data and the reference or location data linked therewith are pair-wise served by a plurality of terminal devices having regard to a plurality of locations at different time instants for determining the probability map structure.

7. The method of claim 1, further comprising determining at least initial motion models through obtaining environment data and location-indicating reference data from a plurality of mobile devices, and determining motion statistics yielding said transition probabilities based on the obtained data.

8. The method of claim 1, further comprising obtaining probabilistic route data indicating at least one element selected from the group consisting of: a probability of a plurality of predefined sequential location transitions within an area, and a probability of a presence within a predefined area of a greater area, a hot spot with a probabilistically higher average concentration of mobile devices within an area, and a cold spot with a probabilistically lower average concentration of mobile devices within an area,
   wherein the route data is utilized in determining the most probable location estimate.

9. The method of claim 1, wherein probabilistic route data indicative of probabilities of routes or locations of mobile devices within an area is determined at least partially based on at least one element selected from the group consisting of: pre-known area characteristics.

10. The method of claim 1, wherein the environment data comprises sensor data from a sensor of the mobile device.

11. The method of claim 1, further comprising obtaining inertial sensor data and determining the most probable location estimate of the mobile device also based thereon.

12. The method of claim 1, wherein data considered less accurate, or position estimated derived therefrom, is adjusted by data considered more accurate.

13. The method of claim 1, further comprising logging position or route data.

14. The method of claim 1, further comprising detecting offset in the obtained environment or positioning data and compensating the offset.

15. A non-transitory carrier medium, comprising program code executable by a computer to execute the method of claim 1.

16. An arrangement for locating a mobile device operable in a wireless network, the arrangement comprising:
   a data repository comprising
      a probability map structure for an area of interest, said probability map structure associating environment data values with location data, and
      a number of probabilistic temporospatial motion models for different types of motion, said models at least partly defining transition probabilities between location estimates relative to time;
   a communication interface configured to obtain at least environment data perceived at the mobile device at a plurality of sequential time instances; and
   a positioning entity configured to determine the most probable location estimate of the mobile device based on combining probability data from both the probability map structure and said motion models,
   wherein the at least environment data is best fitted in the motion models and probability map structure according to predefined criteria.

17. The arrangement of claim 16, wherein at least one temporospatial motion model of said number of models includes one or more elements indicative of at least one motion characteristic selected from the group consisting of: speed, velocity, speed fluctuation, velocity fluctuation, acceleration, deceleration, turn rate, turn frequency, linearity of motion, stop, stop duration, stop frequency, direction change, direction change frequency, and direction reversal.

18. The arrangement of claim 16, wherein said number of temporospatial motion models comprises a model for at least one motion class selected from the group consisting of: walking, crawling, immobility, cycling, running, motor vehicle, car, motorcycle, train, and bus.

19. The arrangement of claim 16, wherein said number of temporospatial motion models comprises a model for at least one geographical area or area type selected from the group consisting of: urban area, countryside, pedestrian area, pedestrian street, highway, forested area, and indoor area.

20. The arrangement of claim 16, wherein at least one temporospatial motion model of said number of models defines a limit or range for a motion characteristic beyond which the probability of the characteristic is substantially zero in said model.

21. The arrangement of claim 16, wherein the probability map structure or a source data structure therefore is determined or updated through obtaining environment data and temporally substantially corresponding location-indicating reference data, and the environment data is linked with the location data provided by the reference data, said environment and reference data being collected by a number of mobile devices.

22. The arrangement of claim 21, wherein the environment data and the associated reference or location data are pair-wise served by a plurality of terminal devices having regard to a plurality of locations at different time instants for determining the probability map structure.

23. The arrangement of claim 16, wherein at least initial motion models are determined through obtaining environment data and location-indicating reference data from a plurality of mobile devices, and determining motion statistics yielding said transition probabilities based on the obtained data.

24. The arrangement of claim 16, wherein probabilistic route data is obtained, the probabilistic route data indicating at least one element selected from the group consisting of: a probability of a plurality of predefined sequential location transitions within an area, and a probability of a presence within a predefined area of a greater area, a hot spot with a probabilistically higher average concentration of mobile devices within an area, and a cold spot with a probabilistically lower average concentration of mobile devices within an area, and the route data is utilized in determining the most probable location estimate.

25. The arrangement of claim 16, wherein probabilistic route data indicative of probabilities of routes or locations of mobile devices within an area is determined at least partially based on at least one element selected from the group consisting of: pre-known area characteristics.

26. The arrangement of claim 16, wherein the environment data comprises sensor data from a sensor of the mobile device.

27. The arrangement of claim 16, wherein inertial sensor data is obtained and the most probable location estimate of the mobile device also based thereon is determined.

28. The arrangement of claim 16, wherein data is adjusted that is considered less accurate according to a predefined criterion, or position estimated derived therefrom, by data.

29. The arrangement of claim 16, wherein route or position estimate data is logged in a data repository.

30. The arrangement of claim 16, further comprising at least one communications network accessible server.

31. The arrangement of claim 16, further comprising the mobile device.

32. An arrangement for use in positioning, the arrangement comprising:

a mapping entity configured to determine for the area of interest, a probability map structure or a source data structure therefor, said probability map or related source data structure associating environment data values with location data, through obtaining environment data, and temporally substantially corresponding location-indicating reference data, and linking the environment data with the location data provided by the reference data, said environment and related reference data being collected by a number of mobile devices; and a number of probabilistic temporospatial motion models for different types of motion, said models at least partly defining transition probabilities between location estimates relative to time; and a communication interface configured to signal at least part of said probability map structure and motion models to an electronic device for positioning.

* * * * *